(12) United States Patent
Takase et al.

(10) Patent No.: US 6,701,082 B2
(45) Date of Patent: Mar. 2, 2004

(54) CAMERA HAVING DIOPTER ADJUSTMENT MECHANISM

(75) Inventors: Masami Takase, Hino (JP); Hiroshi Kahara, Kowloon (HK); Yukihiko Sugita, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 112 days.

(21) Appl. No.: 09/918,407

(22) Filed: Jul. 30, 2001

(65) Prior Publication Data

US 2002/0018651 A1 Feb. 14, 2002

(30) Foreign Application Priority Data

Aug. 7, 2000 (JP) .......................................... 2000-238987
Aug. 7, 2000 (JP) .......................................... 2000-238988

(51) Int. Cl.[7] ........................ G03B 13/02; G03B 13/08; G02B 25/00
(52) U.S. Cl. ........................ 396/373; 396/382; 396/385; 396/386; 359/432; 359/643
(58) Field of Search ................. 396/148, 373, 396/149, 378, 377, 140, 384, 385, 386, 351, 382, 89, 111, 138, 141, 379, 150; 356/8; 359/432, 642

(56) References Cited

U.S. PATENT DOCUMENTS 4,268,151 A * 5/1981 Kobori et al. .............. 396/382

5,625,487 A * 4/1997 Hasushita et al. .......... 359/432
5,715,490 A * 2/1998 Ishito ......................... 396/378
6,006,038 A * 12/1999 Kosako ........................ 396/29
6,169,859 B1 * 1/2001 Omiya ....................... 396/373

FOREIGN PATENT DOCUMENTS

JP        8-110559 A        4/1996

* cited by examiner

Primary Examiner—Russell Adams
Assistant Examiner—Rochelle Blackman
(74) Attorney, Agent, or Firm—Frishauf, Holtz, Goodman & Chick, P.C.

(57) ABSTRACT

A camera has a rangefinder device having an optical system constituted by a plurality of optical elements and a diopter adjustment mechanism capable of adjusting the observation diopter of the rangefinder device by operation by the user from outside the camera. In addition, there are provided an operating member that operates the diopter adjustment mechanism and an adjustment mechanism that effects adjustment such that the observation diopter of the rangefinder device is at a predetermined value when the operating member is in a prescribed position. By this means, a camera having a diopter adjustment mechanism whereby the relative positional relationship of the operating member and driven member can always be ensured such that the observation diopter gets equal to the predetermined observation diopter that is to be set when the operating member is arranged in the prescribed position. This can be realized by a straightforward construction.

18 Claims, 11 Drawing Sheets

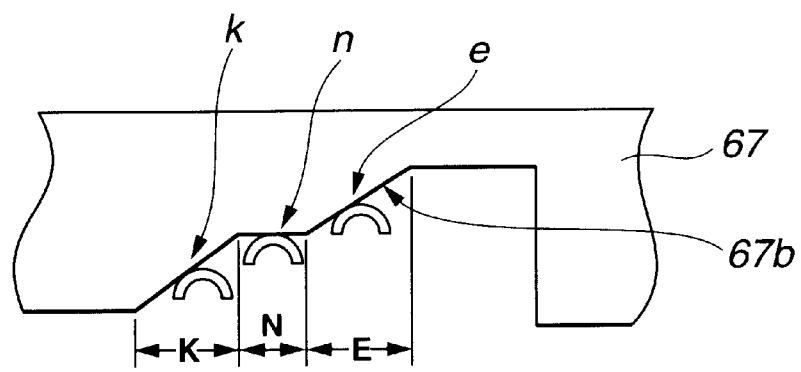
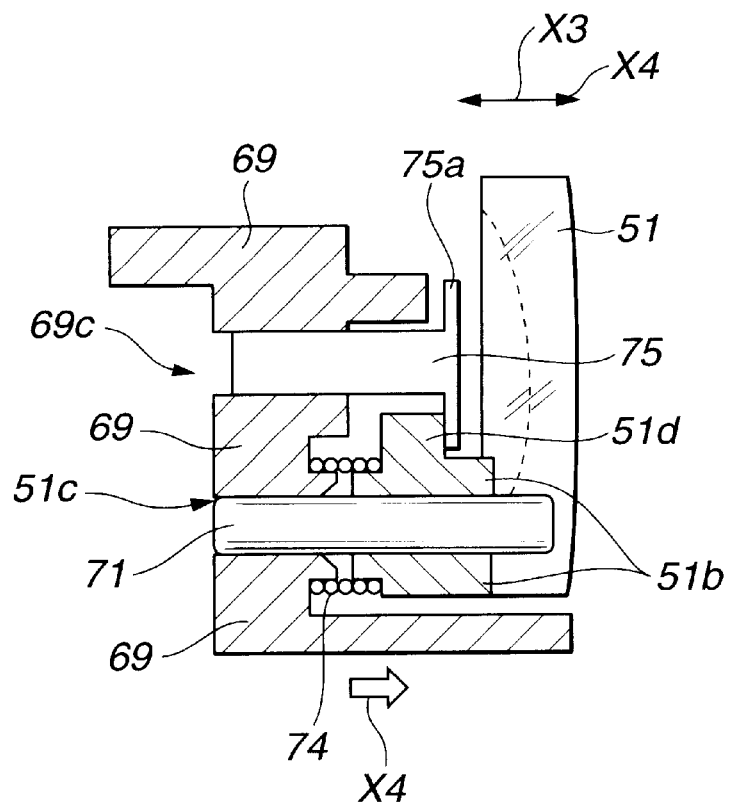

CAMERA HAVING DIOPTER ADJUSTMENT MECHANISM

This application claims benefit of Japanese Application Nos. 2000-238987 filed on Aug. 7, 2000, and 2000-238988 filed on Aug. 7, 2000 the contents of which are incorporated by this reference.

BACKGROUND OF THE INVENTION

1. Field of the Invention

The present invention relates to a camera and in particular relates to a camera having a diopter adjustment mechanism whereby the observation diopter of the rangefinder device can be adjusted from outside by moving part of an optical element comprised in the rangefinder device, by manual action by the user.

2. Description of the Related Art

In cameras whereby photography/image pickup is performed, conventionally, various proposals have been made concerning the provision of a rangefinder device comprising a rangefinder optical system formed by an objective optical system, inverting optical system, and eyepiece optical system, whereby a user can ascertain and observe the range of field of view including a desired image to be observed, and these are in general practical use.

An example of such a rangefinder device in a conventional camera is a so-called real image type rangefinder device constructed such that the observed image formed by the objective optical system is converted into an erect real image through the inverting optical system, which is magnified by the eyepiece optical system and can then be observed. Such a "rangefinder" device is commonly referred to as a "finder" device.

Usually, in a conventional real image type rangefinder device, an observation diopter is set so that the most suitable observation of the rangefinder image is obtained by a typical observer of normal visual acuity i.e. a so-called normal observer.

However, with a rangefinder device in which the observation diopter of the rangefinder device is previously determined in this way to a prescribed value, when the rangefinder image produced by this rangefinder device is observed by an observer whose visual acuity does not match that of the hypothetical observer (i.e. normal observer), that is, a myopic observer or hypermetropic observer etc, a clear rangefinder image cannot be observed due to the mismatch of observation diopter.

Accordingly, the rangefinder devices in conventional cameras etc are provided with a so-called diopter adjustment mechanism whereby the observation diopter of the rangefinder device can be adjusted at will in a prescribed range such as to produce an observation diopter capable of matching the visual acuity of the observer; various such proposals have been made and have been generally put into practice. An example is disclosed in Laid-open Japanese Patent Publication No. H8-110559.

Such diopter adjustment mechanisms are implemented, for example, by providing a mechanism whereby at least one of the optical components such as an optical element like an eyepiece lens constituting part of the eyepiece optical system can be displaced within a prescribed range in a prescribed direction (such as the direction along the optic axis), thereby enabling the observation diopter to be adjusted at will from outside by manual operation of a prescribed operating member.

For example, in a camera equipped with a diopter adjustment mechanism for adjusting the observation diopter of the rangefinder device so as to provide an observation diopter at which observation by the observer is easy, the aforementioned Laid-open Japanese Patent Publication No. H8-110559 discloses the provision of a diopter adjustment mechanism to enable the displacement in the direction along the optic axis i.e. the forwards/rearwards direction with respect to the camera body of part of the eyepiece optical system in a rangefinder optical system, by means of an operating member (operating knob etc) and an end face cam member that rotates integrally therewith, arranged on the side of a camera casing member. By this means, adjustment can be achieved such that an optimum observation diopter is produced for clear observation of the rangefinder image, by operating the operating member from outside.

In such a conventional diopter adjustment mechanism arranged in a camera rangefinder device, there may be provided for example an operating member and an indication such as a prescribed index in order to display the set condition of the observation diopter in response to the set position of the operating member in the vicinity thereof, in order to confirm the condition of the observation diopter corresponding to the position of setting of the operating member.

However, if the camera is operated by a user who is unaccustomed to the operating procedure and an adjustment mechanism requires a complicated operation, the user may not understand which operating member is to be operated in what manner, since the user may not have the knowledge or experience necessary to operate it. In such cases, it is conceivable that incorrect operation may be performed such as that even an emmetropic user may adjust the setting of the observation diopter to that intended for a hypermetropic person or myopic person. Thus, if the observation diopter is not correctly set in accordance with the visual acuity of the user, because of inappropriate operation, convenience and ease of operation when using this device may of course be impaired.

Accordingly, in order to prevent this state of affairs, consideration has been given to explicit indication in what condition the observation diopter is set relative to the set position of the operating member, by relating the observation diopter of the rangefinder image with the set position of this operating member when the operating member has been operated.

However, in a construction such as the means disclosed by the above Laid-open Japanese Patent Publication No. H8-110559 i.e. a construction in which an operating member (operating knob) for moving the rangefinder optical system (eyepiece lens) is mounted on a casing member of the camera and the eyepiece lens constituting the driven member that is driven by this operating member is provided in the camera body, there are the following problems. Specifically, there is the problem that, if dimensional errors produced during manufacture of the various structural members and assembly errors produced during assembly thereof combine, offset may be produced in the observation diopter that should be set in respect of the position of the operating member. It is needed to provide means to maintain the relative relationship in which the observation diopter always gets equal to the prescribed observation diopter when the operating member is arranged in the prescribed position.

It can also happen that the operating member for adjustment of the observation diopter is moved whilst the camera is in use, resulting in setting of the observation diopter to a different value to that set by the user. Some means is therefore necessary whereby, while the operating member for activating the diopter adjustment mechanism is constructed such that it can easily be operated to perform setting, once setting of the observation diopter has been performed, this operating member is not easily displaced from its set position.

SUMMARY OF THE INVENTION

The present invention was made in view of the above, an object thereof being to provide by a more straightforward construction a camera having a diopter adjustment mechanism whereby the observation diopter of the rangefinder device can be adjusted from outside by a moving part (driven member) of an optical element comprised in the rangefinder device, by operation of the operating member by the user. That camera is provided with a diopter adjustment mechanism capable of always ensuring a relative positional relationship of the operating member and driven member such that when the operating member is arranged in a prescribed position the observation diopter gets equal to the prescribed observation diopter which should be set.

Also, a further object of the present invention is to provide a camera wherein, when the operating member is arranged in a standard prescribed set position, it is arranged that the operating member cannot be unintentionally displaced, and that the fact that the operating member is in the standard position can easily be identified, thereby contributing to improvement in ease of operation.

A camera according to the present invention comprises a rangefinder device having an optical system constituted by a plurality of optical elements and a diopter adjustment mechanism capable of adjusting the observation diopter of the rangefinder device by operation by the user from the exterior of the camera. Furthermore, it comprises an operating member for actuating the diopter adjustment mechanism and an adjustment mechanism for effecting adjustment such that the observation diopter of the rangefinder device is a predetermined value when the operating member is in a prescribed position.

The above and other objects, features and advantages of the invention will become more clearly understood from the following description referring to the accompanying drawings.

BRIEF DESCRIPTION OF THE DRAWINGS

FIG. 9 is a view illustrating how displacement of observation diopter is produced by the diopter adjustment mechanism of the rangefinder device of the camera of FIG. 1;

FIG. 12 is a detail vertical cross-sectional view of the adjustment mechanism of FIG. 11.

DESCRIPTION OF THE PREFERRED EMBODIMENTS

Figure 1:
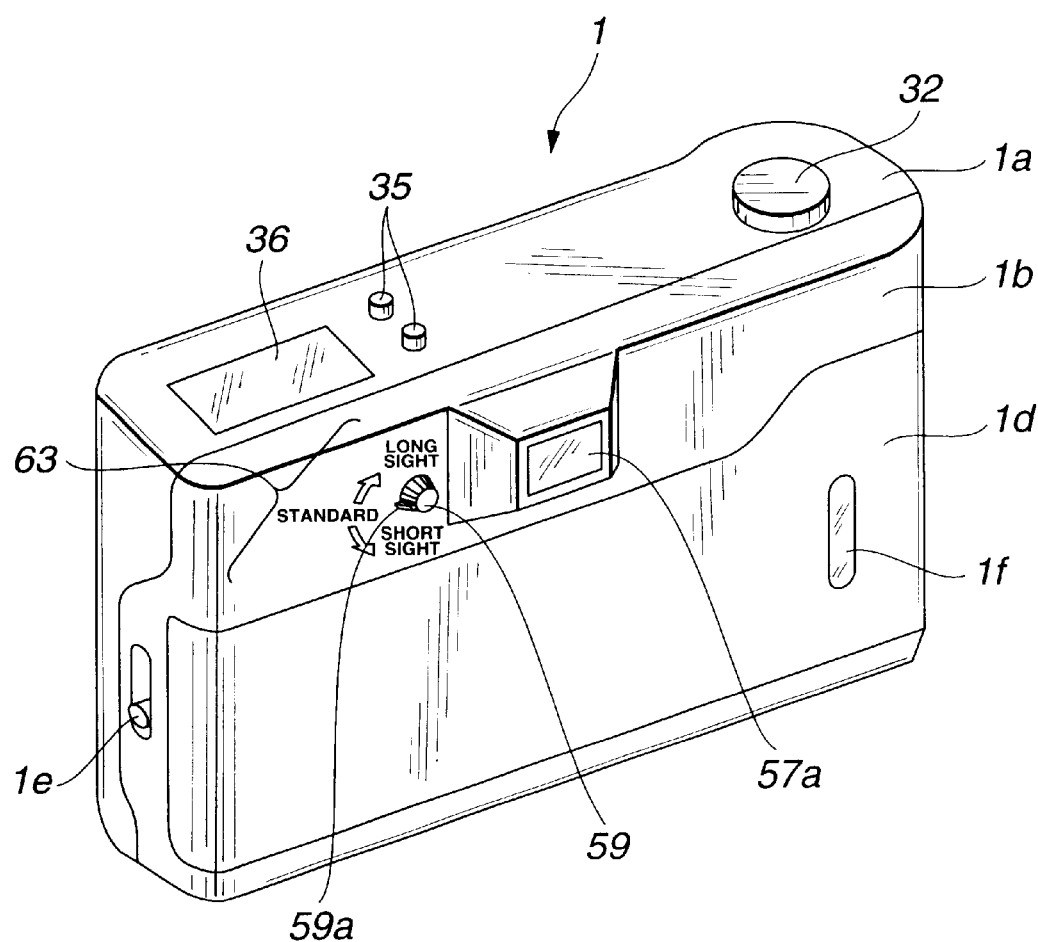
FIG. 1 is a perspective view illustrating the external appearance of the rear side of a camera according to a first embodiment of the present invention.
Figure 2:
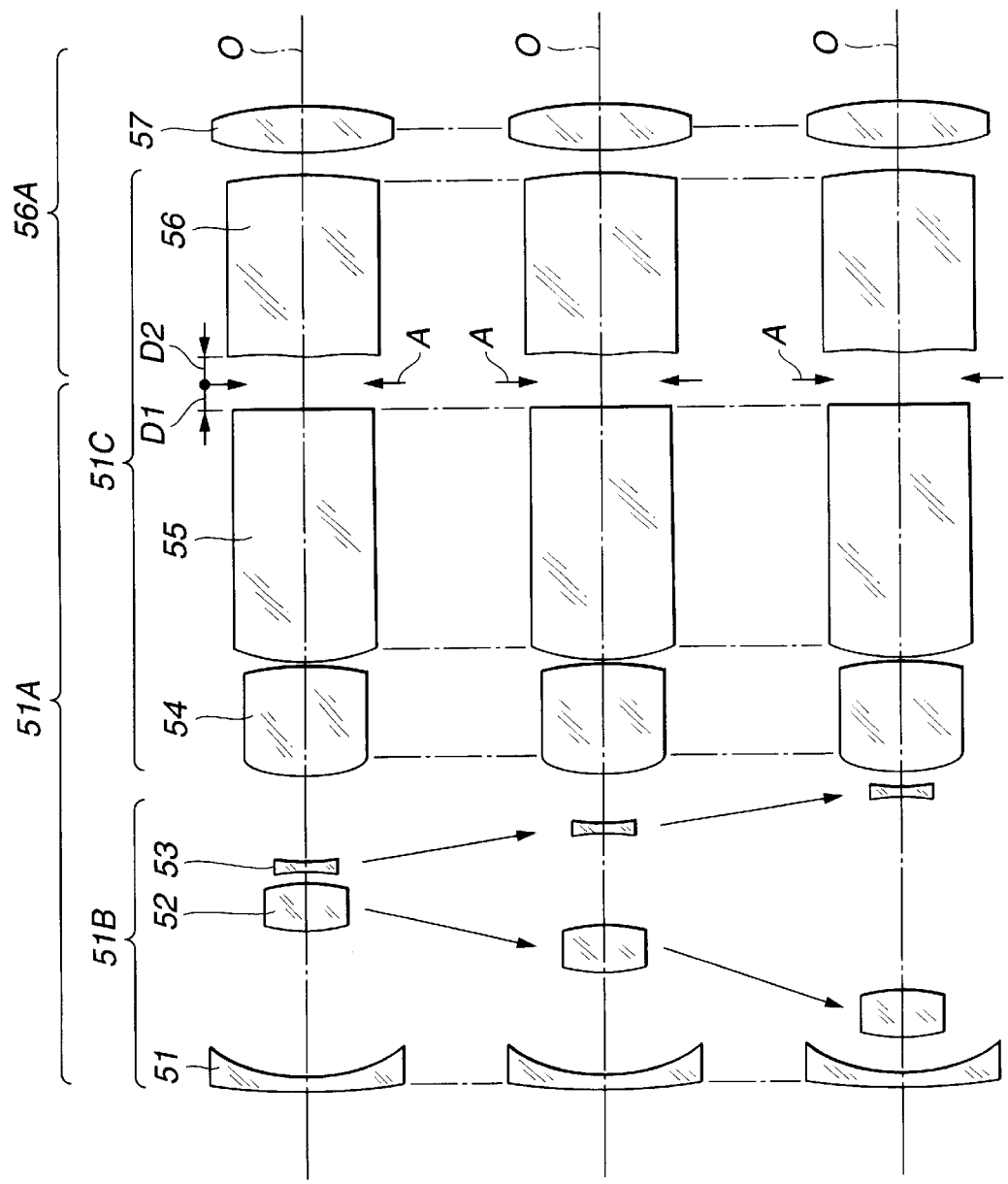
FIG. 2A, FIG. 2B and FIG. 2C are views illustrating the main construction of a rangefinder device of the camera of FIG. 1, being opened-out views of the optical system illustrating the rangefinder optical system of this rangefinder device in opened-out fashion, illustrating the arrangement of the objective optical system at the prescribed focal point position.
Figure 3:
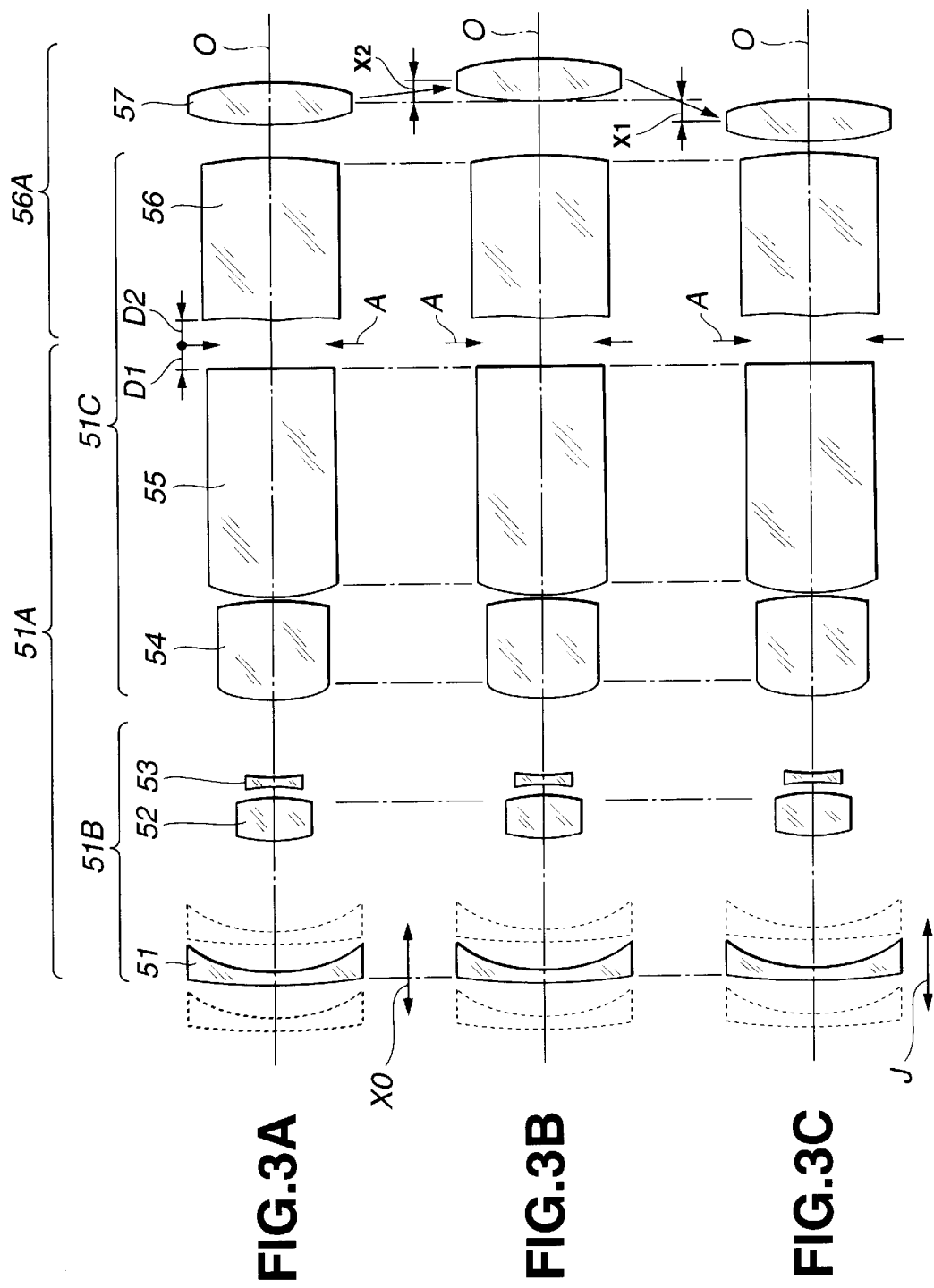
FIG. 3A, FIG. 3B and FIG. 3C are views illustrating the main construction of a rangefinder device of the camera of FIG. 1, being opened-out views of the optical system illustrating the rangefinder optical system of this rangefinder device in opened-out fashion, illustrating the arrangement of the objective optical system and eyepiece optical system at the prescribed focal point position.

The present invention is described below with reference to embodiments illustrated in the drawings.

FIG. 1 is a perspective view illustrating the external appearance of the rear side of a camera according to a first embodiment of the present invention.

The main unit and the various structural members of camera 1 of this embodiment are covered by a cover member formed by front cover 1a and rear cover 1b.

In the cover member of this camera 1, various operating members are arranged, being arranged in prescribed positions such that parts of the various structural members arranged in the interior of this cover member are exposed to the outside. For example, on the upper face of camera 1, there are arranged operating members such as a release button 32 constituting an operating member that is operated on commencement of photographic action and a plurality of mode changeover operating buttons 35 constituting operating members for performing various setting operations such as setting of photographic mode or the internal clock, or setting relating to the strobe mechanism, and an information display member 36 for displaying in prescribed form such as pictures or letters photographic mode information or date/time information, or camera state information in a manner such that this can be visually recognized and comprising for example liquid crystal display devices (LCDs).

Also, at the rear face of this camera 1, there are provided an aperture for mounting film in the interior of this camera 1, and a back cover 1d for covering this aperture. This back cover 1d is arranged such that it can be opened and closed by being freely rotatably journalled at the edge of rear cover 1b. When back cover 1d is in the closed condition (condition shown in FIG. 1), this condition is held by means of a prescribed locking mechanism (not shown). An engagement release member 1e for putting back cover 1d in open condition by releasing this locking mechanism from this condition is arranged at a prescribed position on one side face of this camera 1.

Furthermore, at a prescribed position somewhat towards one edge of back cover 1d, there is arranged a film checking window 1f for ascertaining whether or not a film cartridge loaded in the interior of this camera 1 is present.

A rangefinder ocular window 57a is arranged on the side of the eyepiece optical system in the rangefinder optical system of the rangefinder device arranged within this camera 1, in the vicinity of the upper edge of approximately the middle portion of the back face of camera 1. An eyepiece 57 to be described later (see FIGS. 2A to 6 and FIG. 8) are arranged at a prescribed position inside the rangefinder ocular window 57a.

At a prescribed position in the vicinity of rangefinder ocular window 57a, a diopter adjustment operating dial 59, which is a member constituting part of a diopter adjustment mechanism (described in detail later, see FIG. 7 and FIG. 8) for adjusting the observation diopter in the rangefinder device of this camera 1 within a prescribed range and constituting an operating member for driving this diopter adjustment mechanism is arranged to be freely rotatable within a prescribed range. A projection 59a of prescribed shape is integrally formed on part of the outer circumferential surface of this diopter adjustment operating dial 59.

Also, at a prescribed position on the rear cover 1b corresponding to projection 59a of diopter adjustment operating dial 59, prescribed indices 63 corresponding to the observation diopter that can be set by this diopter adjustment mechanism of camera 1 are arranged, using prescribed means such as for example printing/coating or attachment of a sticker.

These indices 63 are represented by means such as for example letters, pictures or symbols and are provided in order to give an indication whereby it is easily possible to ascertain visually what the observation diopter that can be set by the diopter adjustment mechanism of this camera 1 is. For the indices 63 in this embodiment, specifically the following are employed.

That is, a row of letters reading "standard" is displayed at a prescribed position as shown in FIG. 1. A row of letters "long sight" is displayed at a prescribed position in the clockwise direction from this row of letters "standard" and a row of letters "short sight" at a prescribed position in the anti-clockwise direction from this row of letters "standard", respectively. Also, from the row of letters "standard" towards the row of letters "long sight", an arrow of prescribed form and, from the row of letters "standard" towards the row of letters "short sight" an arrow of prescribed form are respectively indicated.

Thus, when the projection 59a of diopter adjustment operating dial 59 is arranged in the position indicated by "standard" (condition shown in FIG. 1), the observation diopter that is set by this diopter adjustment mechanism is set to an observation diopter corresponding to an emmetropic person.

Also, when the diopter adjustment operating dial 59 is rotated from this "standard" position in the clockwise direction, the observation diopter that is set by this diopter adjustment mechanism is set to an observation diopter corresponding to a hypermetropic person. In contrast, when diopter adjustment operating dial 59 is rotated from the "standard" position in the anti-clockwise direction, the observation diopter that is set by this diopter adjustment mechanism is set to an observation diopter corresponding to a myopic person.

Specifically, diopter adjustment operating dial 59 is an operating member for moving (driving) the eyepiece lens 57 (driven member), of the eyepiece optical system of the rangefinder optical system, in a direction along the optic axis. Thus, when the diopter adjustment operating dial 59 is at the "standard" position referred to above, the eyepiece lens 57 assumes a position corresponding to a prescribed observation diopter that is previously set in correspondence with the visual acuity of an emmetropic person. The projection 59a of diopter adjustment operating dial 59 is arranged so as to correspondingly point to "standard" of the indices 63, that carries this meaning.

Likewise, when diopter adjustment operating dial 59 is rotated in the clockwise direction, eyepiece lens 57 is moved so that the observation diopter is gradually displaced from the "standard" observation diopter towards the observation diopter on the "hypermetropic" side and projection 59a comes to be arranged in an arbitrary position on the "hypermetropic" side, referred to above. In contrast, when this diopter adjustment operating dial 59 is rotated in the anti-clockwise direction, eyepiece lens 57 is moved such that the observation diopter is gradually displaced from the "standard" observation diopter towards the "myopic" side, and projection 59a comes to be arranged in an arbitrary position on the "myopic" side, referred to above. The detailed construction and action of the diopter adjustment mechanism will be described later.

Thus, the diopter adjustment mechanism in this camera 1 is such that it is possible to perform adjustment of the observation diopter in any desired way by rotating diopter adjustment operating dial 59 in a prescribed direction within a prescribed range. Also, the observation diopter, which is displaced with rotation of diopter adjustment operating dial 59, can thus be displaced in stepwise fashion.

Next, the detailed construction of the rangefinder device in a camera according to this embodiment is described below.

FIG. 2A to FIG. 6 are views illustrating the main construction of the rangefinder device of a camera according to this embodiment. Of these, FIG. 2A to FIG. 3C are opened-out views of the optical system showing the rangefinder optical system in this rangefinder device in opened-out condition, the path of the luminous flux that enters the rangefinder optical system being shown diagrammatically.

FIG. 2A shows the condition in which the rangefinder optical system is set at the shortest focal point position on the wide angle side; FIG. 2B shows the condition in which the rangefinder optical system is set at the standard focal point position, and FIG. 2C shows the condition in which the rangefinder optical system is set at the longest focal point position on the long-range side, respectively.

Also, FIG. 3A to FIG. 3C respectively independently show the condition of movement of part of the objective optical system and part of the eyepiece optical system. FIG. 3A shows the condition in which the eyepiece optical system in this rangefinder optical system is set to the standard position corresponding to an emmetropic person. FIG. 3B shows the condition in which the eyepiece optical system in this rangefinder optical system is set to the far-sight position corresponding to a hypermetropic person. FIG. 3C shows the condition in which the eyepiece optical system in this rangefinder optical system is set to the near-sight position corresponding to a myopic person. The adjustment range of the objective optical system produced by the adjustment mechanism such that the prescribed observation diopter is obtained when the eyepiece optical system is in each of the conditions of FIG. 3A, FIG. 3B and FIG. 3C is shown.

Figure 4:
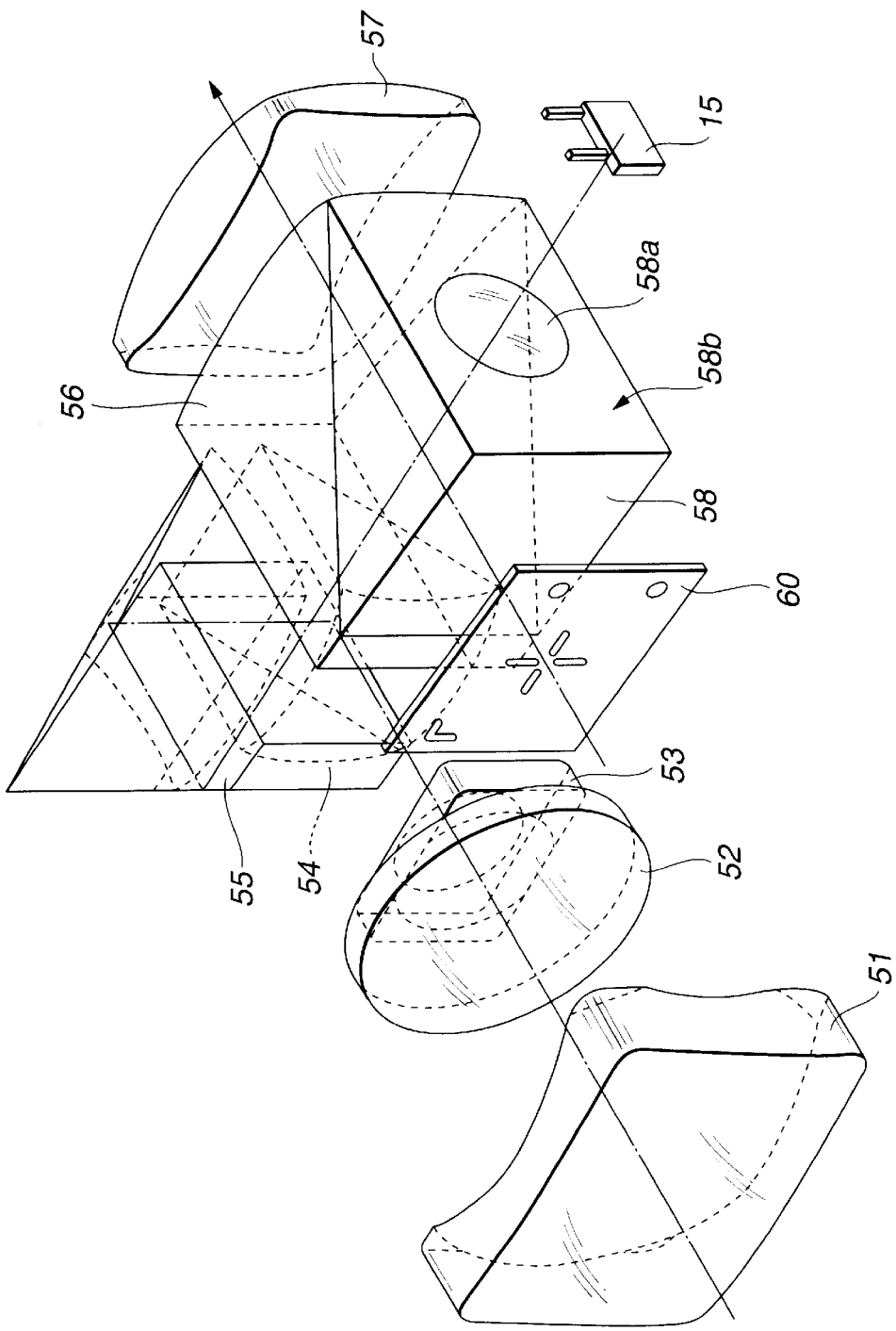
FIG. 4 is a perspective view and optical path diagram illustrating the arrangement of members, extracting chiefly the members constituting the rangefinder optical system, out of the structural members in the rangefinder device of the camera of FIG. 1.
Figure 5:
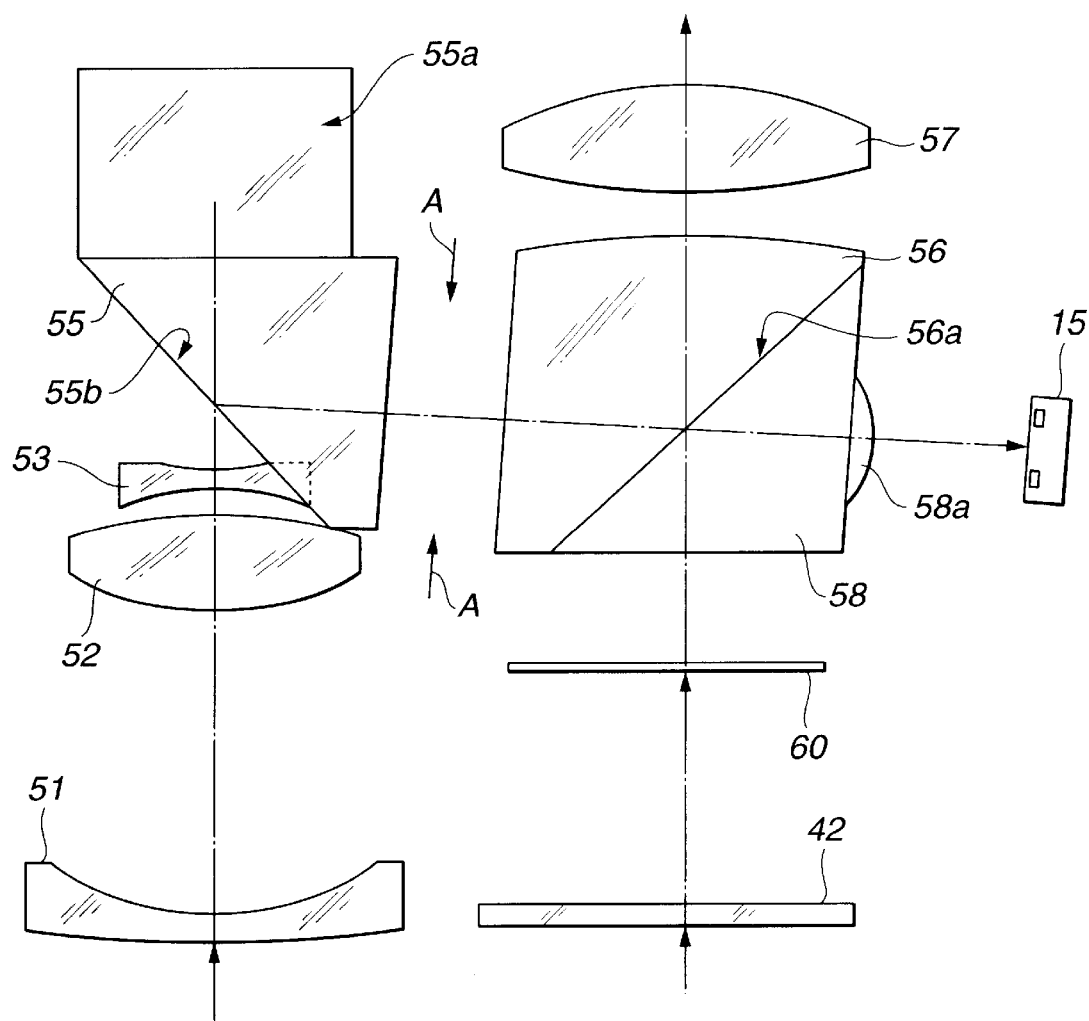
FIG. 5 is a top view and optical path diagram illustrating the arrangement of members, extracting chiefly the members constituting the rangefinder optical system, out of the structural members in the rangefinder device of the camera of FIG. 1.
Figure 6:
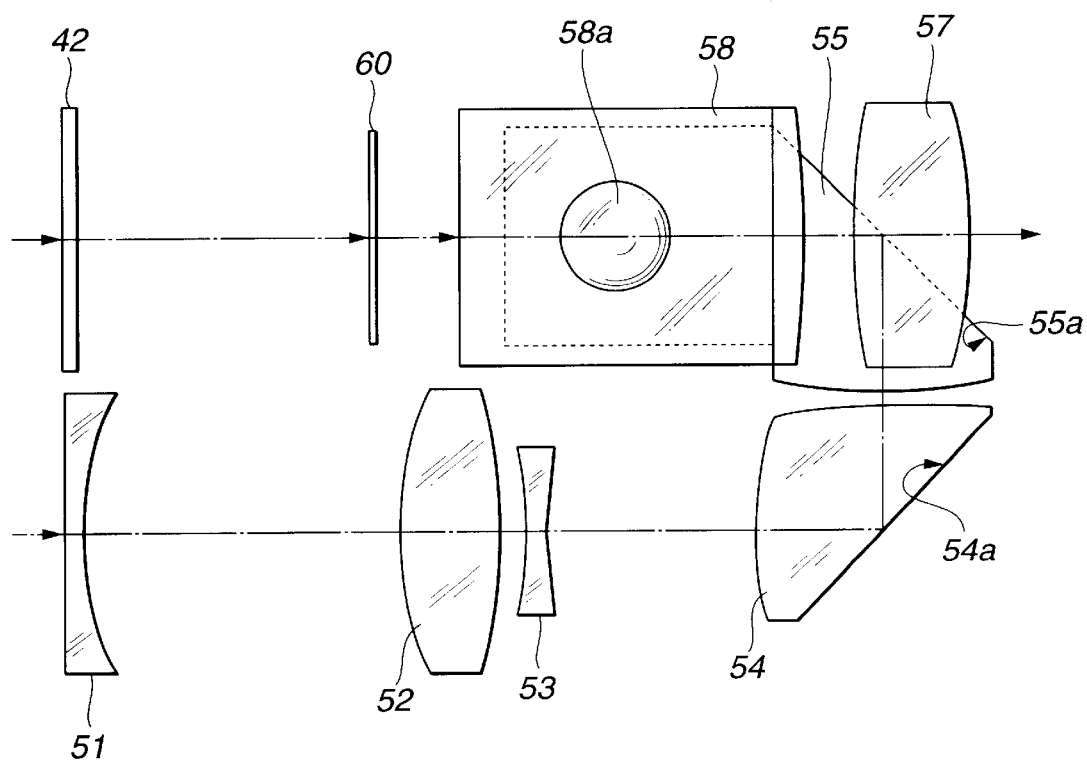
FIG. 6 is a side view and optical path diagram illustrating the arrangement of members, extracting chiefly the members constituting the rangefinder optical system, out of the structural members in the rangefinder device of the camera of FIG. 1.

FIG. 4, FIG. 5 and FIG. 6 are member arrangement views showing the arrangement, extracting chiefly the members that constitute the rangefinder optical system, out of the structural members in this rangefinder device. Of these, FIG. 4 shows a perspective view, FIG. 5 shows a top view, and FIG. 6 shows a side view, respectively.

FIG. 4, FIG. 5 and FIG. 6 show the construction of the rangefinder optical system and are also optical path diagrams showing in combination the optical path of the luminous flux that enters this rangefinder optical system. Also, the symbol A in FIG. 2A to FIG. 3C and FIG. 5 indicates the forming position of the observed image produced by the objective optical system.

As shown in FIG. 2A to FIG. 3C, the rangefinder optical system in the rangefinder device of a camera according to this embodiment is constructed by a plurality of optical elements. Specifically, the rangefinder optical system is constituted by an objective optical system 51A formed by objective lens group 51B (51, 52, 53) and part (54, 55) of inverting optical system 51C, and eyepiece optical system 56A formed by another part (56) of inverting optical system 51C and eyepiece lens (57).

Objective lens group 51B is for forming an observation image by receiving luminous flux from the photographic subject, and is constituted by a plurality of optical components (lenses). Specifically, it is formed by a first lens 51 arranged at a prescribed position on the front side of the main unit, and second lens 52 and third lens 53 that respectively move to prescribed positions in a manner linked with the zoom action of the photographic optical system (not shown) provided at the front face of a camera 1, these being provided such as to be freely moveable in the direction along optic axis O as shown in FIG. 2A to FIG. 2C.

Inverting optical system 51C is formed by three prisms and is provided in order to turn the observation image formed by the objective lens group into an erect real image. Specifically, inverting optical system 51C is formed by a first prism 54 and second prism 55 that constitute part of objective optical system 51A and a third prism 56 that constitutes part of eyepiece optical system 56A. Of these, first prism 54 is formed having in its interior a first reflecting face 54a (see FIG. 6) formed with a reflecting face by aluminum evaporation etc. Also, second prism 55 is formed having in its interior two totally reflecting faces consisting of a second reflecting face 55a (see FIG. 6) and third reflecting face 55b (see FIG. 5). Third prism 56 is formed having in its interior a single transparent reflecting face 56a (so-called half-mirror; see FIG. 5). The transparent reflecting face 56a is the final reflecting face in the rangefinder optical system of the rangefinder device of this camera 1.

Objective optical system 51A is constituted by an objective lens group 51B comprising first, second and third lenses 51, 52 and 53 for forming an observation image on receipt of luminous flux from the photographic subject, as described, and, of the inverting optical system 51C, first and second prisms 54 and 55 for imaging the observation image formed by this objective lens group 51B in a prescribed mode at a prescribed position.

Eyepiece optical system 56A is provided in order to form a magnified image suitable for observation of the observation image, converted to an erect real image by inverting optical system 51C, and is formed by the respective optical components: third prism 56 of inverting optical system 51C and eyepiece lens 57 (so-called loupe).

Of these, eyepiece lens 57, as shown in FIG. 3A to FIG. 3C, is arranged so as to be capable of stepwise movement in the direction along the optic axis 0 of the rangefinder optical system. That is, this eyepiece lens 57 is arranged to be moved by prescribed means i.e. a prescribed diopter adjustment mechanism respectively between a standard position corresponding to an emmetropic person shown in FIG. 3A, a far-sight position corresponding to a hypermetropic person shown in FIG. 3B, and a near-sight position corresponding to a myopic person shown in FIG. 3C (see FIG. 7, FIG. 8, FIG. 9, and FIG. 10. The details will be described later). To achieve this, it is arranged to be capable of being moved in the range of symbol X2 from the standard position of FIG. 3A to the far-sight position of FIG. 3B. Also, it is arranged to be capable of being moved in the range of symbol X1 from the standard position of FIG. 3A to the far-sight position of FIG. 3C.

As shown in FIG. 2A to FIG. 3C, second prism 55 and third prism 56 are arranged having a prescribed distance between these two i.e. the distance between symbol D1 and symbol D2 shown in FIG. 2A to FIG. 3C.

The observation image formed by objective optical system 51A is set such that an image is formed in a confocal condition at the position indicated by symbol A of FIG. 2A to FIG. 3C. Consequently, in the following description, the position indicated by symbol A in FIG. 2A to FIG. 3C will be termed the image forming position.

On the other hand, first lens 51 of the objective lens group is arranged to be capable of movement in the prescribed range indicated by symbol X0 in the direction of the arrow J shown in FIG. 3A to FIG. 3C i.e. in the direction along the optic axis O of this rangefinder optical system.

In this way, the image forming position mentioned above can be adjusted such as to provide a prescribed observation diopter by moving first lens 51 in the direction along optic axis O i.e. in the forwards/backwards direction of the camera 1 when the eyepiece lens 57 is put in the respective conditions shown in FIG. 3A, FIG. 3B and FIG. 3C by the diopter adjustment mechanism. This adjustment mechanism will be described in detail later (see FIG. 9 and FIG. 10).

The respective optical components (lenses and prisms etc) constituting the optical systems are respectively arranged as shown in FIG. 4, FIG. 5 and FIG. 6.

On the other hand, in the rangefinder optical system in the rangefinder device of the present camera, apart from the optical system for forming the observation image, a fourth prism 58 is provided for adjusting the direction of advance of the luminous flux that enters the optical system of this rangefinder. This fourth prism 58 is stuck on to the outside surface of the face where transparent reflecting face 56a of third prism 56 mentioned above is provided and is thereby arranged integrally with the third prism 56 (see FIG. 4 and FIG. 5).

In the vicinity of fourth prism 58, there are arranged in a prescribed position a measurement sensor 15 constituting a part of photometric means and an internal display board 60 of the rangefinder, constituting internal display means of the rangefinder. The internal display board 60 displays a prescribed information i.e. rangefinder field of view information by superimposing it on the observation image, facilitating the obserbility as a result.

Photometric sensor 15 is arranged on the optic path of the luminous flux that advances through transparent reflecting face 56*a* of third prism 56 i.e. on the extended line of the input optic axis into the transparent reflecting face 56*a*. In addition, photometric sensor 15 is arranged in a prescribed position such that the photodetection surface of the photometric sensor 15 is arranged to face the condensing lens 58*a* of fourth prism 58.

After the luminous flux from the second prism 55 has been reflected by transparent reflecting face 56*a* of third prism 56, it advances towards eyepiece lens 57. The internal display board 60 of the rangefinder is arranged on the extended line of the optic axis (optical path) of this luminous flux i.e. on the extended line of the optical axis of reflection of transparent reflecting face 56*a*, at a prescribed position on the opposite side to the side where eyepiece lens 57 is arranged, between third prism 56 and fourth prism 58 i.e. in a prescribed position towards the front face of camera 1. The position in which the internal display board 60 of this rangefinder is arranged is set so as to constitute a position which is approximately optically equivalent to the imaging position of the observation image formed by the objective optical system (position indicated by the symbol A in FIG. 2A to FIG. 3C).

Also, as shown in FIG. 5 and FIG. 6, a light-collecting window 42 made of polished glass or the like constituting illumination means for illuminating rangefinder internal display board 60 by admitting natural light from outside this camera 1 is arranged at a prescribed position in front of rangefinder internal display board 60 i.e. at the front face of camera 1. Treatment is performed to convert the inside face of this light-collecting window 42 i.e. the face directed towards the interior of camera 1 into a diffusion face.

Furthermore, a condensing lens 58*a* is integrally arranged on the optical path of the same luminous flux at emission face 58*b* of the fourth prism 58 that emits luminous flux that advances linearly therethrough without being reflected by the transparent reflecting face 56*a* of this third prism 56 when this flux is input from second prism 55 to third prism 56. This condensing lens 58*a* is arranged in a position such that the input luminous flux is emitted in a prescribed direction i.e. towards the photodetection surface of photometric sensor 15.

Thus, the fourth prism 58 plays the roles of directing towards eyepiece lens 57 luminous flux transmitted through transparent reflecting face 56*a* of third prism 56, which has been transmitted through rangefinder internal display board 60 after having been input from light-collecting window 42, as well as directing the transmitted luminous flux towards photometric sensor 15 without being reflected by transparent reflecting face 56*a* of third prism 56. Fourth prism 58 that plays this role therefore does not directly contribute to the functionality for observing the observation image etc. Consequently, description of this fourth prism 58 is omitted in the opened-out view of the rangefinder optical system shown in FIG. 2A to FIG. 3C.

Next, details of the diopter adjustment mechanism in the rangefinder device of a camera according to this embodiment are described below.

Figure 7:
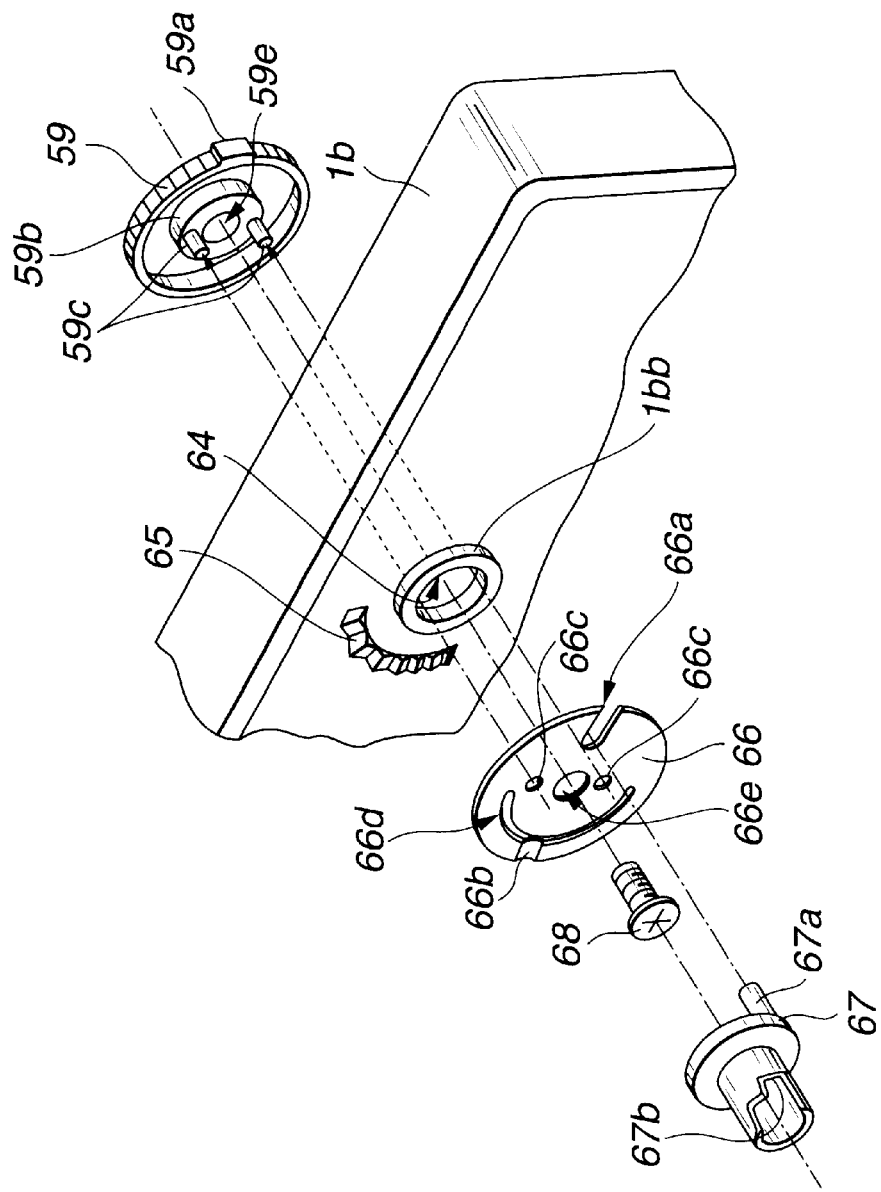
FIG. 7 is a detail exploded perspective view of a diopter adjustment mechanism in the rangefinder device of the camera of FIG. 1.
Figure 8:
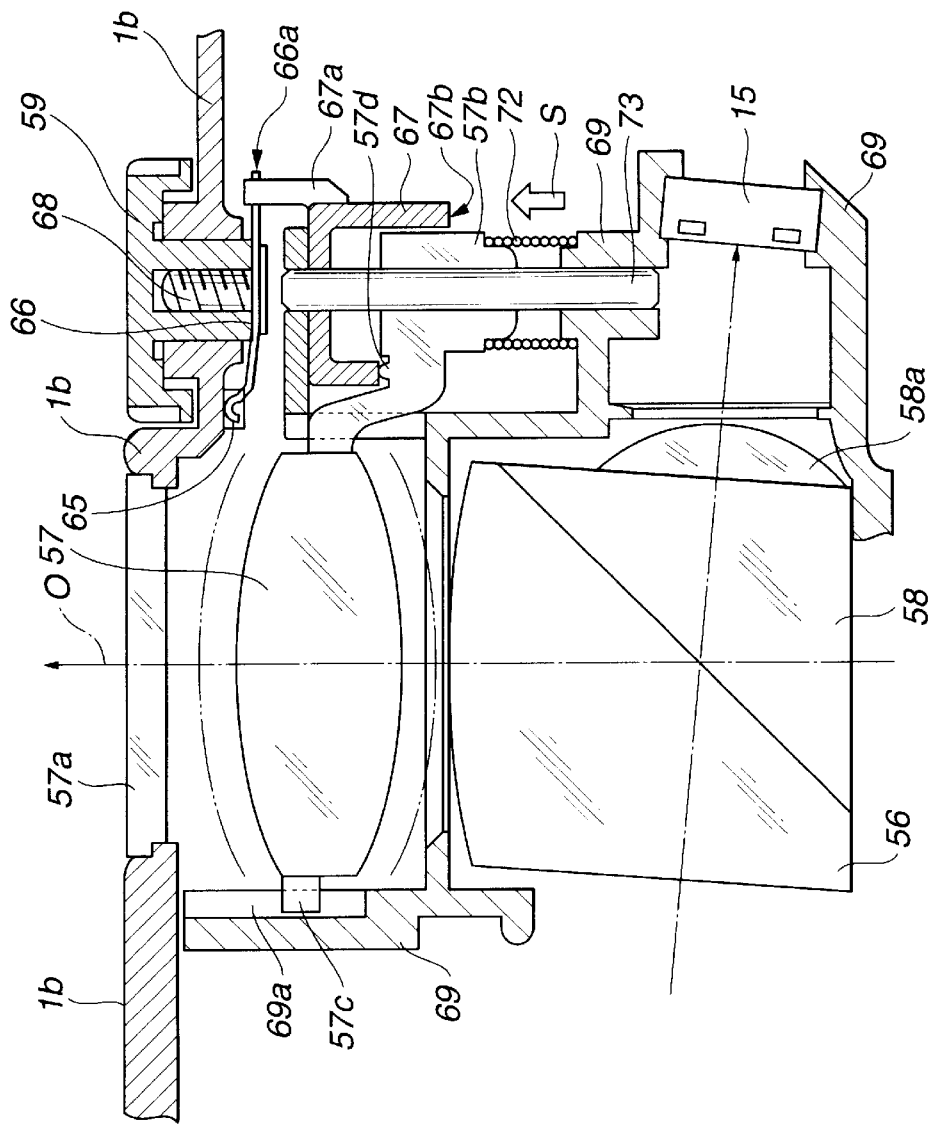
FIG. 8 is a detail cross-sectional view of a diopter adjustment mechanism in the rangefinder device of the camera of FIG. 1.

FIG. 7 and FIG. 8 are views showing part of the rangefinder device of the camera of this embodiment and showing the construction of the diopter adjustment mechanism in this rangefinder device. Specifically, FIG. 7 is a detail exploded perspective view of a diopter adjustment mechanism in this rangefinder device and FIG. 8 is a detail cross-sectional view of the vicinity of where the diopter adjustment mechanism is arranged in this rangefinder device.

The diopter adjustment mechanism in the rangefinder device of camera 1 of this embodiment is constituted such as to perform stepwise adjustment of the observation diopter by moving the eyepiece lens 57, which is a prescribed optical element of the plurality of optical elements (lenses) constituting the rangefinder optical system, in a prescribed direction i.e. the optic axis direction of the rangefinder optical system in a stepwise manner in a prescribed range, by prescribed movement means.

In FIG. 8, the condition in which eyepiece lens 57 is in the standard position is shown in solid lines and the range of movement of this eyepiece lens 57 is indicated by a two-dotted chain line.

The diopter adjustment mechanism in the rangefinder device of this camera 1 is constituted by a cam member 67, diopter adjusting adjustment operating dial 59, and a click mechanism. Cam member 67, as shown in FIG. 7, is provided with a cam face 67*b* having a prescribed cam shape and abutting with a prescribed position of eyepiece lens 57 (not shown in FIG. 7). Cam face 67*b* constitutes an end face cam having a displacement along the circumferential direction of cam member 67. Diopter adjustment operating dial 59 is an operating member capable of moving eyepiece lens 57 in a prescribed direction in response to cam face 67*b* by rotating this cam member 67 about an axis parallel with the optic axis direction. By rotary operation of this diopter adjustment operating dial 59, eyepiece lens 57 is moved from the standard position (see FIG. 3(A)) corresponding to an emmetropic person into the far-sight position (see FIG. 3(B)) corresponding to a hypermetropic person, or into the myopic position (see FIG. 3(C)) corresponding to a myopic person. The click mechanism is an arresting mechanism that positions eyepiece lens 57 in each of these prescribed positions, by stepwise arrestment of diopter adjustment operating dial 59 during this movement, and holds it in the position.

The click mechanism is constituted by a click spring 66 that rotates integrally with diopter adjustment operating dial 59 and a click cam 65 that is engaged by part of this click spring 66.

Click spring 66 is formed by a thin plate-shaped spring member having resilience formed in approximately disc shape, and is fixed with the diopter adjustment operating dial 59 by prescribed tightening means such as a screw.

Also click cam 65 is formed by a plurality of engagement grooves and is provided in a prescribed position of the inside wall face of the rear cover 1*b*. The rotation of diopter adjustment operating dial 59 and cam member 67 is arrested in stepwise fashion by abutment of the apex of projection 66*b* constituting an engagement portion projecting at a prescribed position of click spring 66 with this plurality of engagement grooves.

The structural members of the diopter adjustment mechanism in this camera 1 are assembled as follows. Specifically, as shown in FIG. 7, diopter adjustment operating dial 59 is passed through through-hole 64 formed in a prescribed position of rear cover 1*b*, and is connected with cam member 67 by means of click spring 66.

In this case, a shaft 59*b* is integrally provided on diopter adjustment operating dial 59. At approximately the center of this shaft 59*b*, there is provided a screw hole 59*e*, and, at the outer periphery of this screw hole 59*e*, two shaft members 59*c* are planted at prescribed positions, separated by an angle of approximately 180°.

On the other hand, at approximately the center of click spring 66, there is provided a hole 66*e* of approximately the same size and diameter and corresponding to screw hole 59e of shaft 59b of diopter adjustment operating dial 59. Also, two small holes 66c are formed in respective prescribed positions corresponding to the two shaft members 59c of diopter adjustment operating dial 59, at the outer circumference of this hole 66e.

Also, at the outer periphery of this click spring 66, there are respectively provided in prescribed respectively facing positions a projection 66b and linking portion 66a. Of these, projection 66b is formed so as to project towards the rear face of this camera 1 when this click spring 66 is assembled as part of this diopter adjustment mechanism. Furthermore, on the inner peripheral side of this projection 66b, there is formed a circular groove 66d in arcuate shape over a prescribed range, projection 66b being freely displaceable in a prescribed direction.

The click spring 66 formed in this way is fixed to diopter adjustment operating dial 59. Specifically, when shaft 59b of diopter adjustment operating dial 59 is mounted on the outside of the rear face of the casing member of camera 1 by insertion in through-hole 64 of rear cover 1b, the shaft 59b of this diopter adjustment operating dial 59 is in a condition projecting into the interior of camera 1 through rear cover 1b. In this condition, click spring 66 is arranged so as to abut the leading end face of shaft 59b. At this point, the two shaft members 59c of shaft 59b fit into the two small holes 66c of this click spring 66 and screw 68 passes through hole 66e, while this screw 68 meshes with screw hole 59e of diopter adjustment operating dial 59. Consequently, by this means, click spring 66 is integrated, gripping the wall face of rear cover 1b with visual adjustment operating dial 59. Click spring 66 is thereby made to execute following movement in response to rotation of diopter adjustment operating dial 59.

A projecting rib 1bb is formed in the vicinity of the periphery of through-hole 64, in a position facing click spring 66 on the inside wall of rear cover 1b. Click cam 65 referred to above is formed in the vicinity of this rib 1bb. Consequently, the apex of projection 66b of click spring 66 abuts with this click cam 65. At this point, the projection 66b of click spring 66 is engaged within one or other engagement groove of the plurality of engagement grooves of click cam 65 by the resilience of projection 66b itself.

On the other hand, cam member 67 is engaged with a first guide shaft member 73 formed at a prescribed position (for example a prescribed position determined by pressing-in means or the like) of rangefinder body 69 as shown in FIG. 8. In this way, this cam member 67 is journalled so as to be freely slidable in the forwards/rearwards direction of this camera 1 i.e. the direction along the optic axis of the rangefinder optical system (see reference symbol O of FIG. 8).

Cam member 67 is formed with a cam face 67b of a prescribed cam shape at one end thereof; at the other end, it is integrally formed with a linking projection 67a that projects towards the rear side of this camera 1 when this cam member 67 is assembled as part of this diopter correction/adjustment mechanism. When cam face 67b referred to above abuts with a prescribed position (abutment 57d of arm 57b) of eyepiece lens 57 linking projection 67a engages with linking part 66a of click spring 66.

In this way, in the diopter adjustment mechanism of this embodiment, the operating member side of the diopter adjustment operating dial 59 mounted on rear cover 1b which constitutes a camera casing member and click spring 66 etc and the drive member of cam member 67 etc mounted on the camera body are mechanically linked by the engagement relationship of linking projection 67a and linking part 66a. The linking projection may be provided either on the drive member or the operating member, and may be formed so as to extend from one side towards the other side. Likewise, the linking part may engage with the linking projection by being provided on a member on the other side, where the linking projection is not formed, on either of the drive member or operating member.

Also, this first guide shaft member 73 is engaged with arm 57b extending from eyepiece lens 57 towards one side. In this way, this eyepiece lens 57 can be moved in a direction along the axis of first guide shaft member 73 i.e. a direction along the optic axis (see reference symbol 0 of FIG. 8) of the rangefinder optical system.

Furthermore, a diopter spring 72 comprising for example an extensible coil spring surrounds first guide shaft member 73. This diopter spring 72 is gripped by one end thereof abutting with a prescribed wall of rangefinder body 69, while the other end thereof abuts with one end of arm 57b of eyepiece lens 57, respectively.

In this way, on first guide shaft member 73 that is fixed to rangefinder body 69, a cam member 67, arm 57b of eyepiece lens 57, and diopter spring 72 are arranged respectively in order from the rear side of camera 1 to be freely moveable in the direction along the axial direction of this first guide shaft member 73. The biasing force of diopter spring 72 therefore acts towards the direction of arrow S in FIG. 8. Abutment portion 57d that is in a prescribed position of arm 57b of eyepiece lens 57 therefore presses against cam face 67b of cam member 67.

Consequently, diopter adjustment operating dial 59 is linked with eyepiece lens 57 through click spring 66 and cam member 67. Eyepiece lens 57 can thereby be moved by a prescribed amount in a prescribed direction by driving eyepiece lens 57 by rotating diopter adjustment operating dial 59 in a prescribed direction.

As described above, arm 57b is provided on one face on eyepiece lens 57. Also, a projection 57c is formed on the other face. This projection 57c engages with a guide groove 69a formed in a position facing rangefinder body 69. In this way, guide groove 69a supports the other end of eyepiece lens 57, and enables movement of this eyepiece lens 57 along guide groove 69a.

In this way, one face of eyepiece lens 57 is supported by first guide shaft member 73 through arm 57b, while its other face is supported by guide groove 69a through projection 57c, respectively.

Cam face 67b of cam member 67 will now be described. FIG. 9 is a view showing how the eyepiece lens 57 is displaced by the diopter adjustment mechanism of the rangefinder device of this embodiment. k is the near-sight position, n is the standard position, and e is the far-sight position.

Cam member 67 is provided in order to move the eyepiece lens 57 in a prescribed direction as described above. Movement of the eyepiece lens 57 i.e. displacement of the observation diopter in the rangefinder device of this camera 1 can be controlled by suitably designing the shape of this cam face 67b.

In camera 1 of this embodiment, cam face 67b of cam member 67 is formed such that displacement of the eyepiece lens 57 is effected in the mode shown in FIG. 9.

As shown in FIG. 9, cam face 67b is formed such that, when the diopter adjustment operating dial 59 (see FIG. 1 and FIG. 7) is in the standard position set to the observation diopter corresponding to an emmetropic person, the observation diopter to be set will be displaced in a prescribed range (range indicated by reference symbol N) even if the rotational position of the cam member 67 is somewhat dislocated from the target position. For this purpose, a flat portion is formed on the cam face 67b so that the eyepiece lens 57 is not displaced in the range indicated by reference symbol N.

Also, cam face 67b is formed such that, when this diopter adjustment operating dial 59 is displaced from the standard position respectively so as to provide an observation diopter on the side corresponding to a hypermetropic person (far-sight position side) or so as to provide an observation diopter on the side corresponding to a myopic person (near-sight position side), the observation diopter that is then set is displaced in a gradual manner, in both cases. In this case, it is arranged for the observation diopter to be approximately continuously displaced in a prescribed range (range indicated by reference symbol E) on the side of the long sight position from the standard position. Likewise, on the side of the near-sight position from the standard position, it is arranged for the observation diopter to be approximately continuously displaced in a prescribed range (range indicated by reference symbol K).

Figure 10:
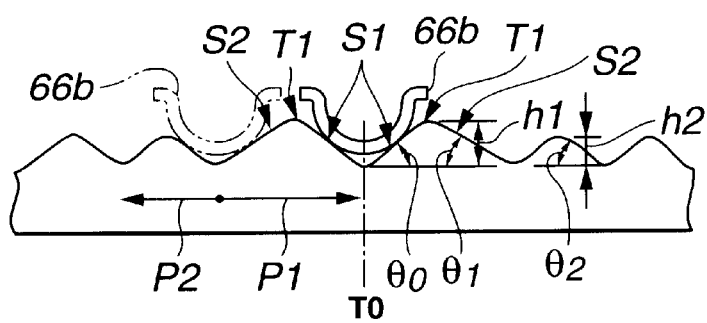
FIG. 10 is a detail cross-sectional view to a larger scale of a click mechanism in the diopter adjustment mechanism of the rangefinder device of the camera of FIG. 1.

Further, the click cam 65 of the click mechanism is formed as follows. FIG. 10 is an essential part cross-sectional view to a larger scale showing to a larger scale an essential part of the click mechanism in the diopter adjustment mechanism of this camera 1, showing the condition in which click cam 65 and projection 66b of click spring 66 are in contact. In FIG. 10, the condition in which projection 66b of click spring 66 is set at the standard position (TO) of click cam 65 is indicated by a solid line and the set condition of click cam 65 when displaced from this condition to an adjacent click position is indicated by a two-dotted chain line.

It is desirable that, in the condition in which projection 66b of click spring 66 is arranged in the standard position of click cam 65, it should be possible for this to be held in stable fashion and maintained in this condition.

When the click spring 66 is moved from the condition in which it is set in this standard position, by operating diopter adjustment operating dial 59, projection 66b of this click spring 66 is moved along the edge of click cam 65. By moving from the engagement groove of the standard position to the engagement groove which is adjacent thereto, projection 66b assumes the condition indicated by the two-dotted chain line in FIG. 10, for example. In this case, projection 66b of click spring 66 moves along the slanting surface S1 forming an engagement groove at the standard position of click cam 65 until it rides over apex T1 and then thereafter moves along the slanting surface S2 forming the adjacent engagement groove; in this process, it is desirable that the movement of projection 66b of click spring 66 should be effected in a smooth fashion.

Also, when click spring 66 is moved from the condition set in another position other than the standard position, for example the condition indicated by the two-dotted chain line in FIG. 10 so as to assume the standard position, by operation of diopter adjustment operating dial 59, it is desirable that click spring 66 should be rapidly displaced towards the standard position of click cam 65.

Accordingly, click cam 65 in camera 1 of this embodiment is formed in the shape shown in FIG. 10. Specifically, in FIG. 10, the shapes of the engagement groove of this click cam 65 are formed so as to gradually change in correspondence with displacement towards the far-sight position or near-sight position, referred to the engagement groove of the standard position. The shape of the engagement grooves of click cam 65 in this condition are set so as to satisfy the conditions:

$$è0>è1$$

$$è0=è2=è3=\ldots$$

$$h1>h2=h3=\ldots$$

where the symbols èx (x=0, 1, 2, . . . ) indicate angles of inclination of the slanting surface (sidewall) informing the engagement groove. Also, the symbols hx (x=1, 2, . . . ) indicate the height of the apex (peak) formed by adjacent slanting surfaces (side walls) of the adjacent engagement grooves of the plurality of engagement grooves.

Consequently, by making h1>h2=h3= . . . , when projection 66b of click spring 66 is in the standard position of click cam 65 (prescribed set position), the degree of engagement of projection 66b and click cam 65 becomes the maximum.

Also, by setting è0>è1, when projection 66b of click spring 66 is displaced from the condition in which it is at the standard position of click cam 65 (prescribed set position) towards the side of the long sight position or towards the side of the short sight position, the inclined face S2 of the engagement groove in the other position adjacent thereto is formed with a more gently inclined face than the inclined face S1 of the engagement groove of the standard position. In other words, the engagement grooves being formed by the slanting surface, the angle of inclination of the slanting surface on the side of the prescribed set position of the engagement groove adjacent to the engagement groove corresponding to the prescribed set position is more gentle than the angle of inclination of the other inclined face.

Thus, the amount of force required to rotate diopter adjustment operating dial 59 when the projection 66b of click spring 66 is moved from the standard position to the other set position i.e. the engagement force of projection 66b of click spring 66 and the engagement groove of click cam 65 (i.e. the amount of arresting force) must be a somewhat stronger force than the amount of rotary force of diopter adjustment operating dial 59 when projection 66b of click spring 66 is moved between this and the other set position (engagement force of projection 66b of click spring 66 and the engagement groove of click cam 65). Consequently, if projection 66b of click spring 66 is set at the standard position of click cam 65, it can be ensured that it is not unintentionally displaced from this position.

Furthermore, as is clear from the expression h1>h2 given above, the amount of rotary force (engagement force) of diopter adjustment operating dial 59 when projection 66b of click spring 66 is displaced from the condition in which it is in a position adjacent the standard position of click cam 65 towards the standard position (in the direction of the arrow P1 in FIG. 10) or is displaced from the standard position towards the adjacent position on the opposite side (in the direction of the arrow P2 in FIG. 10) can be made of an approximately equivalent value by making è1<è2. Thus the amount of rotary force under these conditions is approximately equivalent to the amount of rotary force of diopter adjustment operating dial 59 when projection 66b is in the standard position of click cam 65 and when in a condition other than the condition in which this is in another position adjacent this standard position.

If we make:

amount of force on displacement from the standard position to a position adjacent thereto=F1;

amount of force on displacement from a position adjacent the standard position to the adjacent position on the opposite side of the standard position=F2;

amount of force on displacement from a position adjacent to the standard position to the standard position=F3; and amount of force to perform an operation other than described above=F4, the relationship:

$$F1>F2=F3=F4$$

is established. So long as such a force relationship is satisfied, the relationship expression in regard to the shape of the engagement grooves of click cam 65 given above is not necessarily essential.

Furthermore, by setting to such a shape, when projection 66b of click spring 66 is displaced from the standard position of click cam 65 towards the far-sight position side or near-sight position side, after projection 66b rides over the apex of click cam 65 at the standard position, it will be more smoothly displaced to the other position.

Also, when projection 66b of click spring 66 is displaced from the other position towards the standard position of click cam 65, after projection 66b has ridden past apex T1 of click cam 65 of the standard position, it is rapidly displaced into the standard position.

Only by such setting, the operating force becomes large when operation is effected from the standard position to another position. Consequently, any possibility of diopter adjustment operating dial 59 being moved unintentionally when in the standard position is eliminated. Also, since the amount of operating force is practically fixed when in positions other than the standard position, a satisfactory operating feel can be obtained.

The diopter adjustment mechanism in the rangefinder device of this camera is formed as described above.

Next, details concerning the adjustment mechanism for adjusting the linkage of the diopter adjustment mechanism of the rangefinder device of the camera of this embodiment and the operating member that operates this diopter adjustment mechanism are described below.

Figure 11:
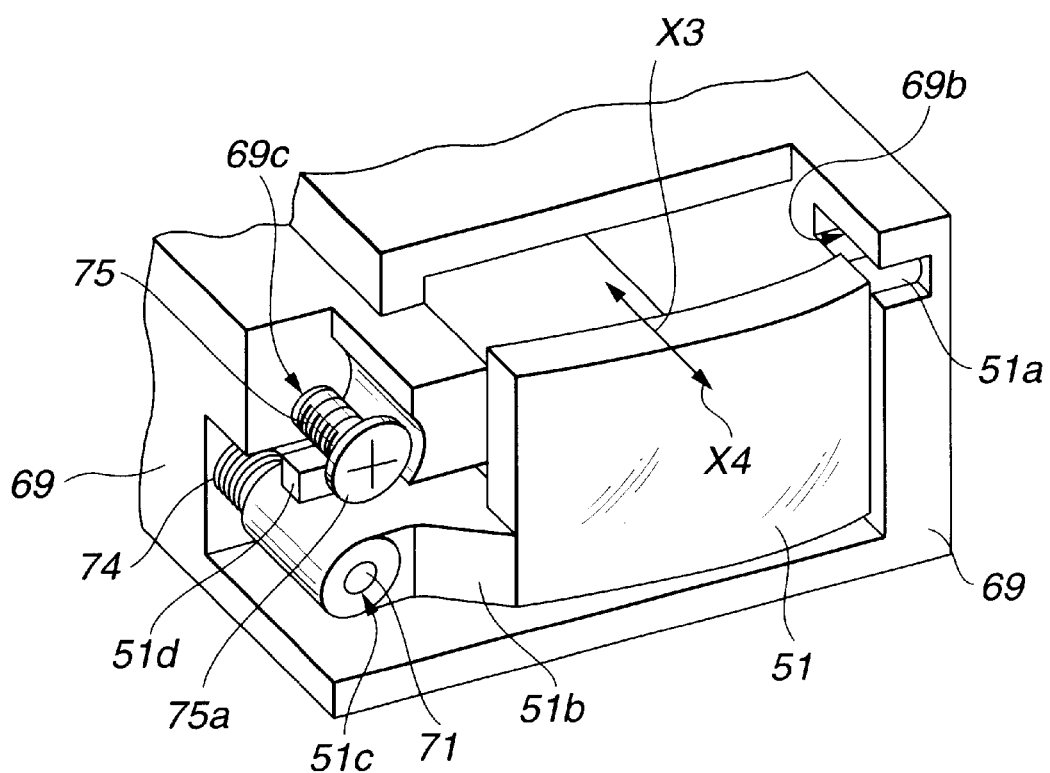
FIG. 11 is a detail perspective view of the vicinity of the adjustment mechanism when adjustment of the diopter adjustment mechanism is performed, illustrating part of the rangefinder device of the camera of FIG. 1.

FIG. 11 and FIG. 12 illustrate part of the rangefinder device of the camera of this embodiment, being essential part of views to a larger scale illustrating the construction of the adjustment mechanism that performs adjustment of the diopter adjustment mechanism in this rangefinder device. Specifically, FIG. 11 is an essential part of perspective views illustrating to a larger scale the external appearance of the vicinity of the adjustment mechanism in this rangefinder device and FIG. 12 is a vertical sectional view of an essential part of the adjustment mechanism of FIG. 11.

The adjustment mechanism in the rangefinder device of camera 1 of this embodiment is provided in order to effect adjustment such that the observation diopter of the rangefinder device has a value which may be predetermined, when the diopter adjustment operating dial 59 (operating member) is in a prescribed condition.

In order to achieve this, in camera 1 of this embodiment, the observation diopter adjustment of first lens 51 of the group of objective lenses constituting prescribed optical elements of the plurality of optical elements (lenses) constituting the rangefinder optical system is arranged to be performed by a prescribed movement means such as to move this continuously in a prescribed range in a prescribed direction i.e. the optic axis direction of the rangefinder optical system (direction of arrow "X3" in FIG. 11 and FIG. 12). The observation diopter is adjusted by moving a lens 51 that constitutes another optical element, different from the eyepiece lens 57f that constitutes a prescribed optical element moved by the diopter adjustment mechanism.

In first lens 51, an arm 51b is integrally formed with one face thereof and a projection 51a is formed on the other face. A through-hole 51c is formed in arm 51b. Also, at a prescribed position of rangefinder body 69, a second guide shaft member 71 is fixed by for example pressing-in means. Second guide shaft member 71 is inserted in through-hole 51c of first lens 51 and supports the first lens 51 so as to be freely slidable.

Also, adjustment spring 74 comprising an extensible coil spring or the like surrounds second guide shaft member 71. One end of this adjustment spring 74 abuts with a prescribed wall of rangefinder body 69, while its other end abuts with the end of arm 51b of first lens 51. Biasing force provided by adjustment spring 74 therefore acts on first lens 51 so as always to move this forwards (direction of arrow "X4" in FIG. 11).

The biasing force of this adjustment spring 74 is stopped by an adjustment screw 75 that is screwed into a prescribed position of rangefinder body 69, being provided in the vicinity of second guide shaft member 71. Specifically, as shown in FIG. 11 and FIG. 12, a screw hole 69c is provided in a prescribed position of rangefinder body 69 in the vicinity of second guide shaft member 71, and an adjustment screw 75 is screwed into this screw hole 69c. Positioning of first lens 51 is made such that this first lens 51 is not caused to fall out by the biasing force of adjustment spring 74, by engaging a projection 51d in a prescribed position on the outer face of arm 51b of first lens 51 with a flange 75a of this adjustment screw 75.

Also, projection 51a formed on the side face on the other side engages with a guide groove 69b formed in a position corresponding to this projection 51a on the side of rangefinder body 69. That is, guide groove 69b is arranged to support the other end side of first lens 51 and to permit movement of this first lens 51 along guide groove 69b.

Consequently, one side face of first lens 51 is supported by second guide shaft member 71 through arm 51b and the other side face is supported by guide groove 69b through projection 51a, respectively.

First lens 51 is arranged to be capable of movement in the direction of arrow "X3", which is the optic axis direction shown in FIG. 11 and FIG. 12, by rotating adjustment screw 75 by a prescribed amount in a prescribed direction.

Thus, in camera 1 of this embodiment constructed in this way, adjustment of the diopter adjustment mechanism during manufacture can easily be performed.

Specifically, during manufacture of this camera 1, after assembly of the rangefinder device by the prescribed procedure, the diopter adjustment mechanism is first put in the standard condition. This standard condition is made to be the same as the condition in which for example the diopter adjustment operating dial 59 matches the prescribed standard position (see FIG. 1 and FIG. 3A). That is, the cam face 67b of cam member 67 is put in a condition in which it abuts with the abutment 57d of eyepiece lens 57 in the range of reference symbol N indicated in FIG. 9. The position of cam member 67 is held by the biasing force of diopter spring 72, since cam face 67b is flat in the range of reference symbol N.

In this condition, first lens 51 of the objective lens group is moved in a prescribed direction by rotating adjustment screw 75 of the adjustment mechanism using a prescribed tool such as a screwdriver. The observation diopter of the rangefinder device is then set to a value which should be predetermined i.e. in this case to the standard position (see FIG. 3A) corresponding to the value of the observation diopter which is optimum for an emmetropic person. Assembly is then completed by the normal procedure.

With this camera 1 manufactured in this way, the position of the diopter adjustment operating dial 59 in this diopter adjustment mechanism is set precisely to the standard observation diopter (the observation diopter which is optimum for an emmetropic person). That is, even if error occurs in the mounting positions of the diopter adjustment operating dial 59 provided on the casing member (rear cover 1b) of camera 1 and eyepiece lens 57 provided on the camera body, this error can be absorbed by the adjustment mechanism. Consequently, accurate setting of the observation diopter that can be set by operating this diopter adjustment operating dial 59 can be achieved, so precise performance of the operation of adjustment of the observation diopter can always be guaranteed.

As described above, in the first embodiment, an adjustment mechanism is provided for effecting adjustment such that, when the diopter adjustment operating dial 59, which is the operating member that performs adjustment of the observation diopter of the rangefinder device of camera 1, is in a prescribed condition, the observation diopter is a value which may be set beforehand; by using this adjustment mechanism to perform beforehand the positional adjustment of the optical system of the rangefinder device during manufacture in such way that an observation diopter is obtained corresponding to the prescribed standard position of diopter adjustment operating dial 59. As a result, component errors and/or assembly errors etc can be absorbed and a rangefinder device can be realized whereby precise adjustment of the observation diopter can be performed using a diopter adjustment mechanism.

Also, the amount of force for rotating the diopter adjustment operating dial 59 when projection 66b of click spring 66 is moved from the standard position to another set position (amount of engagement force of projection 66b of click spring 66 and engagement groove of click cam 65) is set to be somewhat larger than the amount of rotational force (amount of engagement force of projection 66b of click spring 66 and engagement groove of click cam 65) of diopter adjustment operating dial 59 when projection 66b of click spring 66 is moved between such other set positions. In this way, when projection 66b of click spring 66 is set in the standard position of click cam 65, it cannot be unintentionally displaced from this position and the standard position of diopter adjustment operating dial 59 can be identified by the change in the amount of this rotational force. That is, ease of operation is improved, since when the diopter adjustment operating dial 59 is in the standard position it is easily possible to identify this set position.

It should be noted that the adjustment mechanism of the first embodiment described above is constructed as such that the first lens 51, of the objective lens group for performing adjustment of the diopter adjustment mechanism, is moved in a prescribed direction (optic axis direction).

In this adjustment mechanism, the same benefits could be obtained by moving any of the optical elements of the plurality of optical components constituting the rangefinder device in the optic axis direction.

Accordingly, an adjustment mechanism that performs adjustment of the diopter adjustment mechanism could easily be constructed by moving eyepiece lens 57 in a prescribed direction (optic axis direction). A second embodiment of the present invention constructed in this way is described below.

Figure 13:
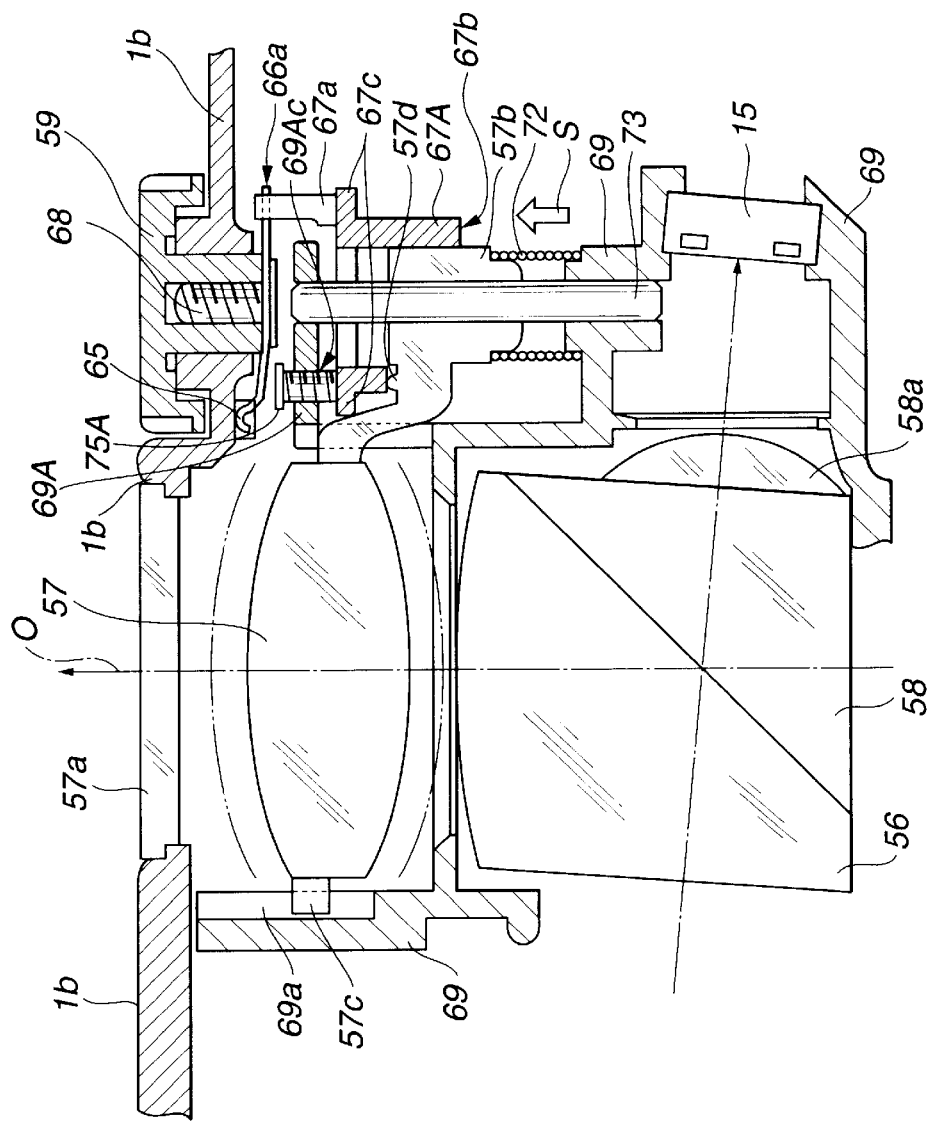
FIG. 13 is a detail cross-sectional view of the diopter adjustment mechanism and adjustment mechanism that adjusts this, in the rangefinder device of a camera according to a second embodiment of the present invention.

FIG. 13 shows part of a rangefinder device in a camera according to a second embodiment of the present invention and is an essential part cross-sectional view of the vicinity of where the diopter adjustment mechanism in this rangefinder device and the adjustment mechanism used to adjust this are arranged. FIG. 13 corresponds to FIG. 8 in the first embodiment described above.

The construction of this second embodiment basically comprises the same construction as that of the first embodiment described above; the difference lies solely in the construction of the adjustment mechanism for adjusting the prescribed position of the observation diopter of the diopter adjustment mechanism as described above. Consequently, in the following description, structural members which are the same as in the first embodiment described above will be given the same reference symbols and further detailed description thereof omitted, the description referring solely to the portions that are different.

The adjustment mechanism in the rangefinder device of this embodiment is arranged to move eyepiece lens 57, as described above, in a direction along the axial direction (optic axis 0) of the first guide shaft member 73; although not shown in FIG. 13, first lens 51 of the object lens group which is freely movably arranged in the first embodiment described above is fixed in a prescribed position of rangefinder body 69.

Eyepiece lens 57 has the same shape as that in the first embodiment described above; arm 57b thereof is journalled by a first guide shaft member 73. Abutment 57d at a prescribed position on this arm 57b is arranged to abut with cam face 67b of cam member 67A that is likewise journalled in first guide shaft member 73.

Cam member 67A is somewhat different in shape from cam member 67 in the first embodiment described above, i.e. an adjustment seat 67c that abuts with the tip of adjustment screw 75A forming part of the adjustment mechanism is formed at an end thereof towards the rear face of this camera 1. The shape of cam face 67b itself is the same as in the first embodiment, described above.

An adjustment screw 75A is threaded into screw hole 69Ac provided at a prescribed position of rangefinder body 69. The tip of adjustment screw 75A abuts with adjustment seat 67c of cam member 67A, described above. The abutment condition of these two is always guaranteed by biasing force of diopter spring 72.

Consequently, by adopting such a construction, when adjustment screw 75A is rotated by a prescribed tool or the like, eyepiece lens 57 is moved in a prescribed direction following this. Specifically, the adjustment mechanism displaces cam member 67A, which is the drive member, in a direction different from the direction of the displacement produced by operation of dial 59, which is the operating member, thereby moving eyepiece lens 57, constituting the optical element.

The rest of the construction is the same as in the case of the first embodiment, described above.

With the second embodiment constructed as above, the same benefits as in the case of the first embodiment can be obtained by a simpler construction.

Also, in this embodiment, since, in the diopter adjustment mechanism, the optical element that effects movement for performing adjustment of the observation diopter and the optical element that effects movement in the adjustment mechanism for performing adjustment of this diopter adjustment mechanism are the same optical element, namely, eyepiece lens 57, simplification of the mechanism can be achieved and there is no possibility of the accumulation of errors; thus, a more reliable adjustment can be achieved.

As described above, with this invention, in a camera having a diopter adjustment mechanism capable of adjusting the observation diopter of the rangefinder device from outside by movement of part (a driven member) of an optical element constituting the rangefinder device by operation of an operating member by the user, an adjustment mechanism capable of always ensuring the relative positional relationship of the operating member and the driven member such that the observation diopter gets equal to the prescribed observation diopter that is to be set when the operating member is arranged in a prescribed position. This can be provided by a simpler construction.

Also, a camera can be provided wherein, when the operating member is arranged in the prescribed set position constituting the standard, the operating member is arranged such that it is not unintentionally displaced and such that it is easy to identify when the operating member is in the standard position; this therefore contributes to improvement in ease of operation.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A camera comprising:
    a finder device having an optical system including a plurality of optical elements;
    a diopter adjustment mechanism which adjusts an observation diopter of said finder device from outside the camera;
    an operating member that operates said diopter adjustment mechanism;
    an adjustment mechanism that effects adjustment by displacing at least a part of said optical system in an optical axis direction such that the observation diopter of said finder device is a predetermined value when said operating member is at a prescribed position; and
    an arresting mechanism which stops movement of said operating member at a plurality of positions within a range of movement of the said operating member;
    wherein said adjustment mechanism is capable of adjusting said observation diopter separately from said diopter adjustment mechanism; and
    wherein an arresting force of said arresting mechanism when said operating member is in the prescribed position is larger than an arresting force of said arresting member when said operating member is in another position.

2. The camera according to claim 1, wherein said diopter adjustment mechanism adjusts the observation diopter of the finder device by movement of a prescribed optical element of said plurality of optical elements of said finder device; and
    said adjustment mechanism effects adjustment such that the observation diopter of said finder device assumes said predetermined value when said operating member is in said prescribed position, by moving said prescribed optical element that is moved by said diopter adjustment mechanism.

3. The camera according to claim 1, wherein said diopter adjustment mechanism adjusts the observation diopter of the finder device by moving a prescribed optical element of said plurality of optical elements of said finder device; and
    said adjustment mechanism effects adjustment such that the observation diopter of said finder device assumes said predetermined value when said operating member is in said prescribed position, by causing movement of another one of said optical elements different from the prescribed optical element moved by said diopter adjustment mechanism.

4. The camera according to claim 1, further comprising:
    a casing member on which said operating member is provided, and which covers the camera body; and
    an index which is provided on at least one of said operating member and said casing, and which indicates that said operating member is in said prescribed position.

5. A camera comprising:
    a finder device having an optical system including a plurality of optical elements;
    a diopter adjustment mechanism which adjusts an observation diopter of said finder device from outside the camera;
    an operating member which operates said diopter adjustment mechanism; and
    an arresting mechanism which stops movement of said operating member at a plurality of positions within a range of movement of said operating member;
    wherein an arresting force of said arresting mechanism when said operating member is in a predetermined standard one of said positions is greater than the arresting force of said arresting mechanism when said operating member is in any other one of said plurality of positions.

6. The camera according to claim 5, further comprising:
    a casing member on which said operating member is provided, and which covers the camera body; and
    an index which is provided on at least one of said operating member and said casing member, and which indicates that said operating member is in said standard position.

7. The camera according to claim 5, wherein the arresting force of said arresting mechanism is substantially fixed at a same value when said operating member is in any one of said plurality of positions other than said standard position.

8. A camera comprising:
    a camera body;
    a casing member which covers the camera body;
    a finder device having an optical system including a plurality of optical elements;
    a diopter adjustment mechanism which adjusts an observation diopter of said finder device by operation from outside the camera by moving a prescribed optical element of said plurality of optical elements;
    an operating member which is provided on said casing member, and which operates said diopter adjustment mechanism;
    a drive member arranged within said camera body for driving said prescribed optical element;
    a linkage projection which is provided on one side of one of said drive member and said operating member, and which extends from one of said drive member and said operating member toward the other of said drive member and said operating member;
    a linking part which is formed on the other of said drive member and said operating member, and which is adapted to be coupled to said linking projection; and an arresting mechanism which stops movement of said operating member in a plurality of positions within a range of movement of said operating member;

wherein an arresting force of said arresting mechanism when said operating member is in a predetermined standard one of said positions is greater than the arresting force of said arresting mechanism when said operating member is in any other one of said plurality of positions.

9. The camera according to claim 8, wherein said diopter adjustment mechanism comprises a cam face adapted to be displaced in a circumferential direction, and said diopter adjustment mechanism moves said prescribed optical element by rotating said drive member with said cam face.

10. The camera according to claim 8, wherein the arresting force of said arresting mechanism is substantially fixed at the same value when said operating member is in any one of said plurality of positions other than said standard position.

11. A camera comprising:

a finder device;

a diopter adjustment mechanism which adjusts an observation diopter of said finder device by operation from outside the camera;

an operating member which operates said diopter adjustment mechanism;

an arresting mechanism which stops movement of said operating member in stepwise fashion in a plurality of positions; and an index indicating the position of said operating member at which said arresting member has stopped movement of said operating member; and wherein an arresting force of said arresting mechanism when said operating member is in a predetermined standard one of said positions is greater than the arresting force of said arresting mechanism when said operating member is in any other one of said plurality of positions.

12. The camera according to claim 11, wherein said arresting mechanism comprises a plurality of engagement grooves and an engagement part that engages the engagement grooves.

13. The camera according to claim 12, wherein an amount of engagement of said engagement grooves and said engagement part when said operating member is in the standard one of said positions is greater than the amount of engagement of said engagement grooves and said engagement part when said operating member is in any other one of said plurality of positions.

14. The camera according to claim 13, wherein each of said engagement grooves is formed by a slanting surface, and an angle of inclination of the slanting surface of the engagement groove at said standard one of said positions is greater than the angle of inclination of the slanting surface of the engagement grooves at any other one of said plurality of positions.

15. The camera according to claim 11, wherein the arresting force of said arresting mechanism is substantially fixed at the same value when said operating member is in any one of said plurality of positions other than said standard position.

16. A camera comprising:

a finder device;

a diopter adjustment mechanism which adjusts an observation diopter of the finder device;

an operating member which is movable to operate the diopter adjustment mechanism; and an arresting mechanism which stops movement of the operating member;

wherein an arresting force of the arresting mechanism when the operating member is in a predetermined position is set greater than an arresting force of the arresting mechanism when the operating member is in any other position.

17. The camera according to claim 16, further comprising:

a casing member on which the operating member is provided, and which covers the camera body; and an index which is provided on at least one of the operating member and the casing member, and which indicates that the operating member is in the predetermined position.

18. The camera according to claim 16, wherein the arresting force of the arresting mechanism is set at substantially a same value when the operating member is in any position other than the predetermined position.

* * * * *